United States Patent [19]

Aya

[11] 4,231,225
[45] Nov. 4, 1980

[54] TURBOCHARGED ENGINE WITH PRESSURIZED GAS RECIRCULATION

[76] Inventor: Kazim K. Aya, 105 N. Kendall, Apt. 3R, Kalamazoo, Mich. 49007

[21] Appl. No.: 9,646

[22] Filed: Feb. 5, 1979

[51] Int. Cl.³ .............................................. F02B 37/00
[52] U.S. Cl. ......................................... 60/612; 60/605
[58] Field of Search .............. 60/605, 612; 123/119 A

[56] References Cited

U.S. PATENT DOCUMENTS

| | | | |
|---|---|---|---|
| 3,776,207 | 12/1973 | Simko | 123/119 A |
| 4,009,574 | 3/1977 | Melchior | 60/605 X |
| 4,179,892 | 12/1979 | Heydrich | 60/605 |

Primary Examiner—Michael Koczo
Attorney, Agent, or Firm—Blanchard, Flynn, Thiel, Boutell & Tanis

[57] ABSTRACT

A multi-cylinder internal combustion engine, such as for a vehicle, having some of the cylinders connected to a first exhaust manifold and the remaining cylinders connected to a second exhaust manifold. The exhaust gases in the first exhaust manifold are used for driving the turbine section of a first turbocharger, the compressor section of which forces the air or air-fuel mixture into the intake manifold for distribution to the cylinders. The exhaust gases discharged from the first turbocharger are then supplied through an intermediate conduit to the compressor section of a second turbocharger, the turbine section of which is driven by the exhaust gases from the second exhaust manifold. The compressor section of the second turbocharger communicates with the intake manifold so that the fraction of the exhaust gases which are pressurized by the second turbocharger are mixed with the air or air-fuel mixture therein. A part of the exhaust gases are thus recycled through the cylinders to achieve higher compression ratios while utilizing leaner fuel mixtures.

6 Claims, 1 Drawing Figure

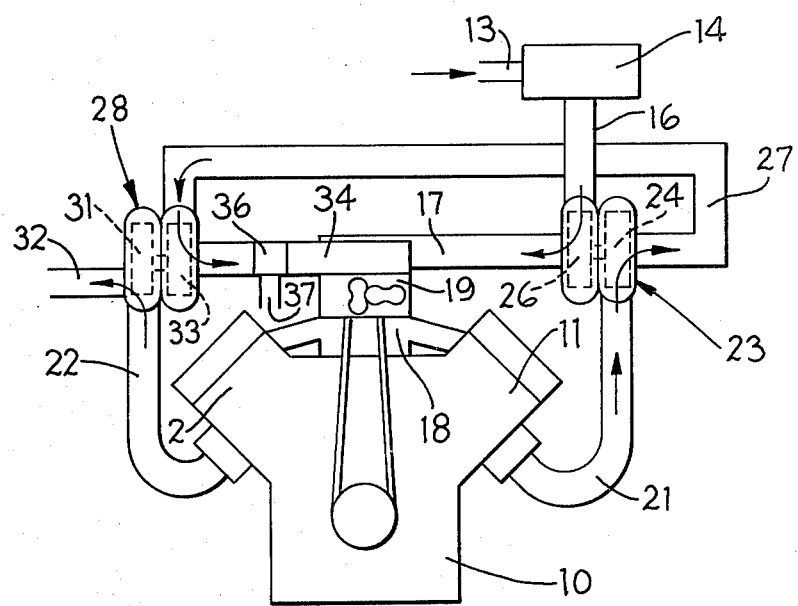

TURBOCHARGED ENGINE WITH PRESSURIZED GAS RECIRCULATION

FIELD OF THE INVENTION

This invention relates to a multi-cylinder internal combustion engine, particularly for a vehicle, and specifically to an improved turbocharger system for utilization with the engine so that a portion of the exhaust gases are resupplied to the combustion chambers to achieve a higher compression ratio while utilizing a lean fuel-air mixture.

BACKGROUND OF THE INVENTION

Many different types and variations of internal combustion engines, specifically engines for vehicles, have utilized turbochargers so as to increase the compression ratio and thereby increase the power generated by the engine. The turbocharger conventionally has the turbine section thereof driven by exhaust gases, with the turbine section driving a compressor section for increasing the pressure of the fuel-air mixture as supplied to the combustion chambers. The exhaust gas, after driving the turbine section, is normally discharged to the atmosphere in a conventional manner. While the use of turbochargers in this manner has proven desirable with respect to the ability of increasing the compression ratio, nevertheless this mode of operation also normally requires that an increased quantity of fuel-air mixture be supplied to the combustion chamber. This thus decreases the fuel efficiency of the engine, and also increases the quantity of undesired emissions in the exhaust gases. This operation also normally requires the use of higher octane fuel, and results in the engine running at a significantly higher temperature. The advantage of utilizing a turbocharger thus causes disadvantages which, in many instances, are of overriding importance so as to prevent the practical use of a turbocharger.

Accordingly, the present invention relates to a multi-cylinder internal combustion engine having an improved turbocharger arrangement associated therewith, which arrangement permits a portion of the exhaust gases to be resupplied to the combustion chambers to achieve higher compression ratios while permitting the use of very lean fuel-air mixtures, thereby permitting more efficient utilization of fuel, and resulting in minimization of undesirable emissions in the exhaust gases. This also enables the utilization of a low octane fuel, permits the engine to run cooler, and enables fast warm-up of the engine to the normal operating temperature. This improved internal combustion engine is thus desirable for use on vehicles since it permits the achievement of a higher power output from the engine, while at the same time providing for more efficient utilization of fuel.

In the improved engine of this invention, the turbocharger arrangement involves the use of first and second turbochargers, the turbine section of the first turbocharger being driven by a part of the exhaust gases from the engine, and the turbine section of the second turbocharger being driven by the remaining exhaust gases from the engine. The compressor section of the first turbocharger is used for supplying the air or air-fuel mixture to the intake manifold of the engine. The exhaust gases discharged from the turbine section of the first turbocharger are then supplied to the compressor section of the second turbocharger which compresses same and supplies these pressurized exhaust gases to the intake manifold for mixing with the air or air-fuel mixture therein. This pressurized mixture is then supplied to the combustion chambers so as to achieve a high compression ratio therein while possessing a minimum amount of fuel-air mixture due to the presence of the hot exhaust gases intermixed therewith.

Other objects and purposes of the invention will be apparent to persons familiar with internal combustion engines upon reading the following specification and inspecting the accompanying drawing.

BRIEF DESCRIPTION OF THE DRAWING

The single FIGURE diagrammatically illustrates a conventional internal combustion engine of the multi-cylinder type, such as a V-8 engine, having the improved turbocharger arrangement of the present invention associated therewith.

DETAILED DESCRIPTION

Referring to the drawing, there is diagrammatically illustrated a conventional internal combustion engine of the type typically utilized in vehicles, which engine is conventionally of the spark-ignition type but can also be of the compression-ignition type. The engine is of a conventional multiple cylinder construction and, in the illustration, is of the type commonly referred to as a V-8 or V-6 inasmuch as half of the cylinders are disposed within the cylinder bank 11 and the remaining cylinders are disposed in the other cylinder bank 12. The construction and operation of such an internal combustion engine is well known.

The engine is provided with an inlet 13 through which air is supplied to a carburetor 14, with the fuel-air mixture from the carburetor being supplied through the inlet conduits 16 and 17 to the intake manifold 18 for distribution to the combustion chambers associated with the cylinders. If desired, a conventional supercharger 19 can be associated with the inlet conduit 17, directly upstream of the intake manifold 18, which supercharger is typically mechanically driven from the engine crankshaft so as to achieve higher pressurization of the air-fuel mixture.

The exhaust gases from the cylinders associated with the banks 11 and 12 are discharged into exhaust manifolds 21 and 22, respectively. The hot exhaust gases in the manifold 21 are utilized for powering a conventional turbocharger 23. The turbocharger 23 includes a conventional turbine section 24 which is rotatably driven by the hot exhaust gases, which turbine section in turn rotatably drives the compressor section 26, the latter being associated with the intake conduits 16 and 17 so as to pressurize the air-fuel mixture which is supplied in the intake manifold 18. The structure and operation of the turbocharger 23 is thus conventional.

The hot exhaust gases within the manifold 21, after driving the turbine section 24, are then discharged therefrom into an intermediate conduit 27 which supplies these exhaust gases to the compressor section 33 of a further turbocharger 28. This turbocharger 28 again includes a turbine section 31 which communicates with the other exhaust manifold 22 so that the hot exhaust gases therein cause rotation of the turbine section 31, following which these exhaust gases are then exhausted through the conduit 32 to the atmosphere in a conventional manner, such as through a conventional muffler arrangement.

The turbine section 31 in turn rotatably drives the compressor section 33, which compressor section communicates with the intermediate conduit 27 and hence causes pressurization of the hot exhaust gases which are being supplied therethrough. The hot exhaust gases pressurized by the compressor section 33 are then supplied to a further inlet conduit 34, which in turn communicates with the intake manifold 18, whereupon the pressurized exhaust gases are thus intermixed with the air-fuel mixture supplied through the other inlet conduit 17.

The inlet conduit 34 has an adjustable by-pass valve 36 associated therewith so as to regulate the quantity of pressurized exhaust gases which are supplied to the intake manifold 18. When this by-pass valve 36 is at least partially open, then a fraction of the pressurized exhaust gases within conduit 34 are bled off into the exhaust passage 37 for discharge to the atmosphere.

OPERATION

The operation of the engine according to the present invention is believed self-evident from the above description, but same will be briefly explained to insure a complete understanding thereof.

During operation of the engine, the fuel-air mixture is supplied through the inlet conduits 16 and 17 into the intake manifold 18, from which this mixture is then supplied to the combustion chambers of the individual cylinders. After combustion, the exhaust gases from the individual cylinders flow into the exhaust manifolds 21 and 22. The hot exhaust gases from manifold 21 are utilized to drive the turbine section 24 of the first turbocharger 23, which in turn drives the compressor section 26 so that the fuel-air mixture within inlet conduits 16-17 is thus pressurized. The mixture within the intake manifold 18 is thus at a higher pressure level to permit the creation of a higher compression ratio within the combustion chambers. The exhaust gases, after discharge from the turbine section 24, then flow through the intermediate conduit 27 and are supplied to the compressor section 33 of the second turbocharger 28. The turbine section 31 of this latter turbocharger is in turn driven by the exhaust gases supplied through the other exhaust manifold 22, which exhaust gases are then discharged from the turbine section into the passage 32 for discharge to the atmosphere in the usual manner. The pressurized exhaust gases from the compressor section 33 flow into the inlet conduit 34 and, depending upon the position of the bypass valve 36, some or all of these pressurized exhaust gases are supplied to the intake manifold 18 for intermixing with the fuel-air mixture therein. This resulting mixture is thus supplied to the combustion chambers so as to achieve the desired high compression ratio, while at the same time the mixture possesses a smaller quantity of fuel than would otherwise be required if the exhaust gases had not been at least partially resupplied to the combustion chambers. The heat of the exhaust gases also causes preheating of the fuel-air mixture to further facilitate the efficient combustion thereof within the engine. This also minimizes the amount of undesired exhaust emissions.

While the above explanation and the accompanying drawing illustrates the engine utilizing a conventional carburetor so that the fuel-air mixture flows through conduits 16-17 into the intake manifold, it will be appreciated that the engine of the present invention can also utilize a conventional fuel injection system if desired, in which case the carburetor 14 would be eliminated and solely air would be supplied through the inlet conduits 16-17.

The combustion engine as above described is also of the V-type, although it will be appreciated that the present invention is equally applicable to an engine of any configuration, such as an engine wherein the cylinders are disposed in a straight line. While the engine can be provided with two separate exhaust manifolds with each connected to approximately half of the cylinders, as illustrated and as described above, it will be appreciated that the engine can be provided with a single exhaust manifold communicating with all of the cylinders and this single exhaust manifold could then be provided with a suitable adjustable divider valve for causing the exhaust gases to flow into two separate exhaust conduits such as the conduits 21 and 22 so as to be used as the driving fluid for the two turbochargers.

The present invention is believed to have the most significant effect in terms of increasing the power and fuel economy when utilized on a conventional multiple cylinder four-cycle spark-ignition engine. However, the present invention is also applicable to the conventional compression-ignition engine of the two-cycle type.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an internal combustion engine having a plurality of piston-containing cylinders each defining a combustion chamber, intake manifold means communicating with said combustion chambers, an intake conduit communicating with said intake manifold means for supplying air thereto, an exhaust manifold communicating with said combustion chambers for receiving therefrom the hot exhaust gases, and first turbocharger means for pressurizing the air supplied to said intake manifold means, said first turbocharger means including a rotatable turbine section drivingly connected to and rotatably driving a compressor section, said compressor section being associated with said intake conduit for pressurizing the air which is supplied to said intake manifold means, and a first exhaust conduit providing communication between said exhaust manifold means and said turbine section for rotatably driving said turbine section by the hot exhaust gases which flow through said first exhaust conduit, the improvement comprising second turbocharger means for pressurizing and supplying at least a part of the hot exhaust gases to said intake manifold means, said second turbocharger means including a rotatable turbine part drivingly connected to a rotatable compressor part, a second exhaust conduit communicating between said exhaust manifold means and said turbine part for supplying at least a part of the hot exhaust gases to said turbine part for rotatably driving same, intermediate passage means connected between the discharge of said turbine section and the inlet of said compressor part for supplying the exhaust gases from said first turbocharger means to the compressor part of said second turbocharger means for effecting pressurization of said exhaust gases, and an inlet conduit connected between said compressor part and said intake manifold means for supplying said pressurized exhaust gases from said compressor part to said intake manifold means for mixing with the pressurized air supplied through said intake conduit, the pressurized mixture of exhaust gases and air within said intake manifold means being supplied to said combustion chambers.

2. An engine according to claim 1, wherein said inlet conduit has bypass valve means associated therewith for selectively permitting at least part of the pressurized exhaust gases to be diverted and not supplied to the intake manifold means.

3. An engine according to claim 1, wherein the exhaust gases discharged from the turbine part of said second turbocharger means are discharged to the atmosphere.

4. An engine according to claim 1, wherein the exhaust manifold means includes a first exhaust manifold in communication with some of said combustion chambers and a second exhaust manifold in communication with the remainder of said combustion chambers, said first and second exhaust manifolds being isolated from one another and being respectively individually in communication with said first and second exhaust conduits.

5. An engine according to claim 4, wherein said engine is of a V-shaped configuration and is provided with some of the cylinders in one bank and the remaining cylinders in another bank, each of said banks having one of said exhaust manifolds associated therewith.

6. An engine according to claim 4, wherein the exhaust gases supplied through said second exhaust conduit to said turbine part for rotatably driving same are discharged from said turbine part into a discharge conduit for discharge to the atmosphere, and wherein said inlet conduit has movable bypass valve means associated therewith for selectively adjusting the amount of pressurized exhaust gas which is supplied to said intake manifold means, said bypass valve means permitting communication with an exhaust passage so that at least part of said pressurized exhaust gas can be discharged to the atmosphere.

* * * * *